United States Patent
Nojima

(10) Patent No.: US 6,587,309 B2
(45) Date of Patent: Jul. 1, 2003

(54) SUSPENSION FOR DISC DRIVE

(75) Inventor: Akira Nojima, Atsugi (JP)

(73) Assignee: NHK Spring Co., Ltd., Yokohama (JP)

( * ) Notice: Subject to any disclaimer, the term of this patent is extended or adjusted under 35 U.S.C. 154(b) by 93 days.

(21) Appl. No.: 09/817,463

(22) Filed: Mar. 26, 2001

(65) Prior Publication Data

US 2002/0051324 A1 May 2, 2002

(30) Foreign Application Priority Data

Oct. 30, 2000 (JP) ........................................ 2000-331126

(51) Int. Cl.$^7$ ................................................ G11B 21/16
(52) U.S. Cl. ................................................. 360/245.7
(58) Field of Search ............................. 360/245–245.9

(56) References Cited

U.S. PATENT DOCUMENTS

| | | | |
|---|---|---|---|
| 4,991,045 A | | 2/1991 | Oberg |
| 5,838,517 A | * | 11/1998 | Frater et al. ............. 360/245.7 |
| 6,046,883 A | * | 4/2000 | Miller ..................... 360/245.7 |
| 6,388,843 B1 | * | 5/2002 | Takagi et al. ............ 360/245.7 |

FOREIGN PATENT DOCUMENTS

JP      60-127578     7/1985

OTHER PUBLICATIONS

M. Hanya et al, "Suspension Design for Windage and High Bandwidth", (Treatise), Presented on Mar. 27, 2000, Japan.

U.S. Ser. No. 09/793,410, filed Feb. 26, 2001.

* cited by examiner

*Primary Examiner*—Allen Cao
(74) *Attorney, Agent, or Firm*—Frishauf, Holtz, Goodman & Chick, P.C.

(57) ABSTRACT

In a suspension comprising a limiter, the limiter is provided with arm portions. These arm portions project outside to-be-supported portions of a flexure from the opposite sides of the distal end portion of a beam portion, extend ahead of the to-be-supported portions, and face the respective one-side surfaces of the to-be-supported portions, individually. Formed between the arm portions is an aperture that is wide enough to receive a bonding jig. Formed on the respective inside portions of the distal ends of the arm portions are bent portions, which are bent in the thickness direction so as to be directed from the one-side surfaces of the to-be-supported portions toward the other-side surfaces. Opposite portions extend rearward from the respective distal ends of the bent portions, individually. These opposite portions face the respective other-side surfaces of the to-be-supported portions, individually.

2 Claims, 4 Drawing Sheets

SUSPENSION FOR DISC DRIVE

CROSS-REFERENCE TO RELATED APPLICATIONS

This application is based upon and claims the benefit of priority from the prior Japanese Patent Application No. 2000-331126, filed Oct. 30, 2000, the entire contents of which are incorporated herein by reference.

BACKGROUND OF THE INVENTION

The present invention relates to a suspension for disc drive incorporated in an information processing apparatus, such as a personal computer.

A hard disc drive (HDD) for recording in and reading information from a rotating magnetic disc or magneto-optical disc includes a carriage that can turn around a shaft. The carriage is rotated around the shaft by means of a positioning motor. The carriage is provided with an arm (actuator arm), a suspension mounted on the distal end portion of the arm, a head portion including a slider mounted on the suspension, etc.

When the disc rotates, the slider on the distal end portion of the suspension slightly lifts off the disc surface, whereupon an air bearing is formed between the disc and the slider. The suspension comprises a base portion including a base plate, a beam portion formed of a precision plate spring, a flexure fixed to the beam portion by laser welding or the like, etc.

As in the case of a suspension 1 shown in FIG. 5, a swing of a flexure 4 is proposed to be restrained by means of a limiter 3 that is attached to a beam portion 2. The limiter 3 includes a pair of arm portions 5 extending forward from the opposite sides of the distal end portion of the beam portion 2, bent portions 6 bent substantially at right angles in the thickness direction of the beam portion 2 from outside portions 5a of the respective distal ends of the arm portions 5, individually, and opposite portions 7 extending rearward from the respective distal ends of the bent portions 6 and facing to-be-supported portions 4a of the flexure 4, individually. As the to-be-supported portions 4a of the flexure 4 are inserted into spaces between the arm portions 5 and the opposite portions 7, the flexure 4 is restrained from swinging.

The flexure 4 includes a slider mounting portion 4b for mounting a slider. A terminal of a wiring portion is bonded to a terminal of the slider that is fixed to the slider mounting portion 4b. In this bonding process, a bonding jig is inserted into an aperture 8 between the arm portions 5. In the suspension 1 that is provided with the conventional limiter 3, however, a width A of the aperture 8 is much shorter than a substantial width B of the limiter 3. Inevitably, therefore, jigs that can be inserted into the aperture 8 are limited in size.

BRIEF SUMMARY OF THE INVENTION

Accordingly, the object of the present invention is to provide a suspension for disc drive with a limiter that can be formed having an aperture wide enough to receive a bonding jig.

In order to achieve the above object, according to the present invention, there is provided a suspension for disc drive, which comprises a beam portion, a flexure attached to the beam portion so as to be superposed thereon and having a slider mounting portion fitted with a slider, a wiring portion connected to the slider, and a limiter for restraining a swing of the flexure. In this suspension, the limiter includes a pair of arm portions projecting outside to-be-supported portions of the flexure from the opposite sides of the distal end portion of the beam portion, extending ahead of the to-be-supported portions, and facing the respective one-side surfaces of the to-be-supported portions, individually, an aperture formed between the arm portions and wide enough to receive a jig used in connecting the wiring portion to the slider, bent portions bent in the thickness direction of the beam portion so as to be directed from the one-side surfaces of the to-be-supported portions toward the other-side surfaces at the respective distal ends of the arm portions, individually, and opposite portions extending rearward from the respective distal ends of the bent portions and facing the respective other-side surfaces of the to-be-supported portions, individually. The to-be-supported portions described herein are portions that are touched by the limiter when the flexure swings excessively.

In connecting the slider and the wiring portion, the bonding jig is inserted through the aperture between the arm portions of the limiter, so that a bonding process is carried out with the slider mounting portion of the flexure supported by means of the jig. The limiter may be a component that is formed independently of the beam portion and mounted on the beam portion. Preferably, however, the limiter should be formed integrally with the beam portion to reduce the number of components used in the suspension and the required man-hours for assembly.

According to the present invention, the swing of the flexure can be restrained by means of the limiter that is attached to the beam portion, and the wide aperture can be formed between the arm portions of the limiter. Accordingly, restrictions on the size of the bonding jig to be inserted toward the slider mounting portion of the slider through the aperture can be eased.

The suspension of the invention may further comprise a base portion and a hinge member located between the base portion and the beam portion and springy enough to bend in the thickness direction of the beam portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to FIGS. 1 to 4.

Figure 3:
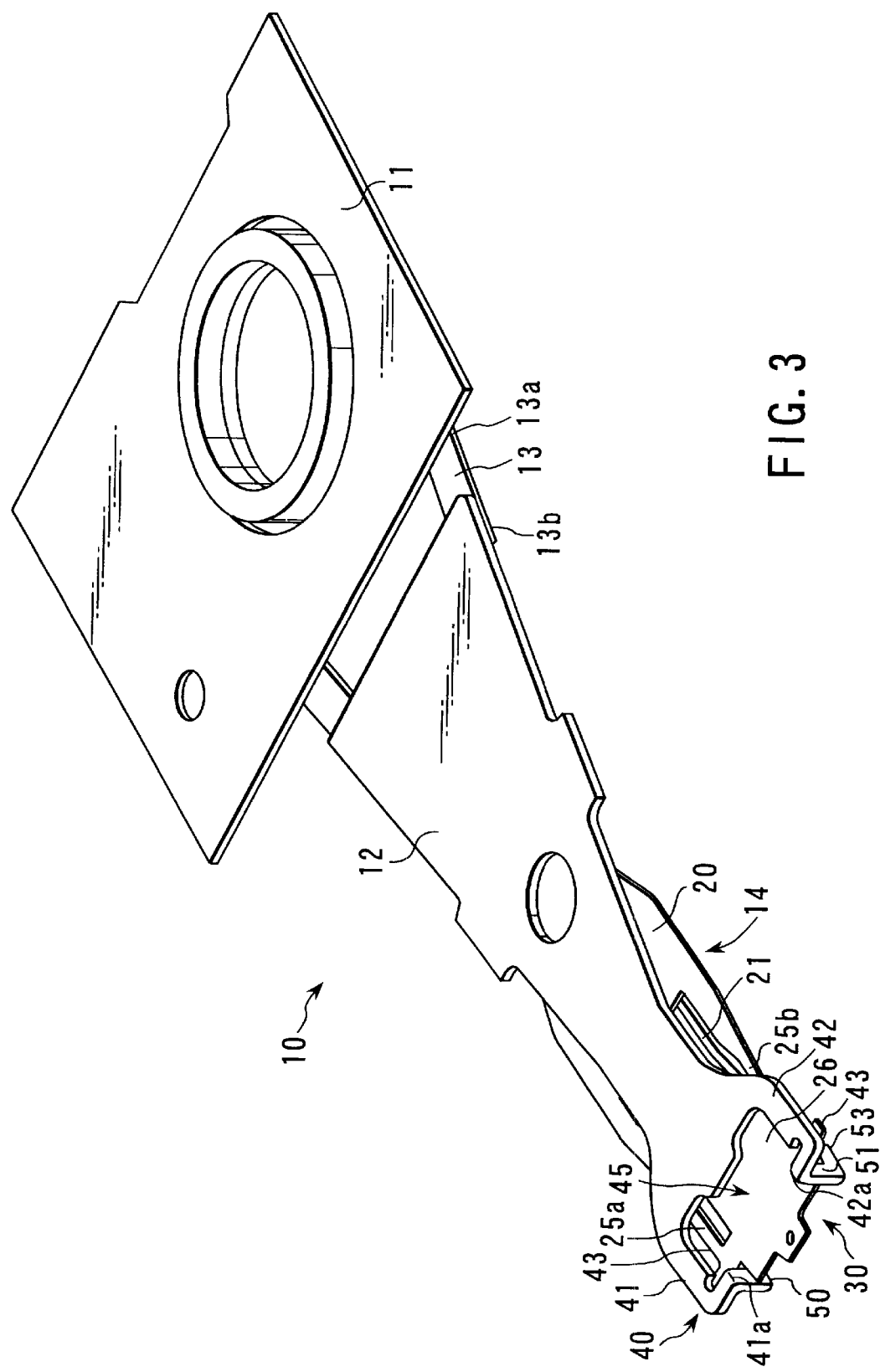
FIG. 3 is a general perspective view of the suspension shown in FIG. 1.
Figure 4:
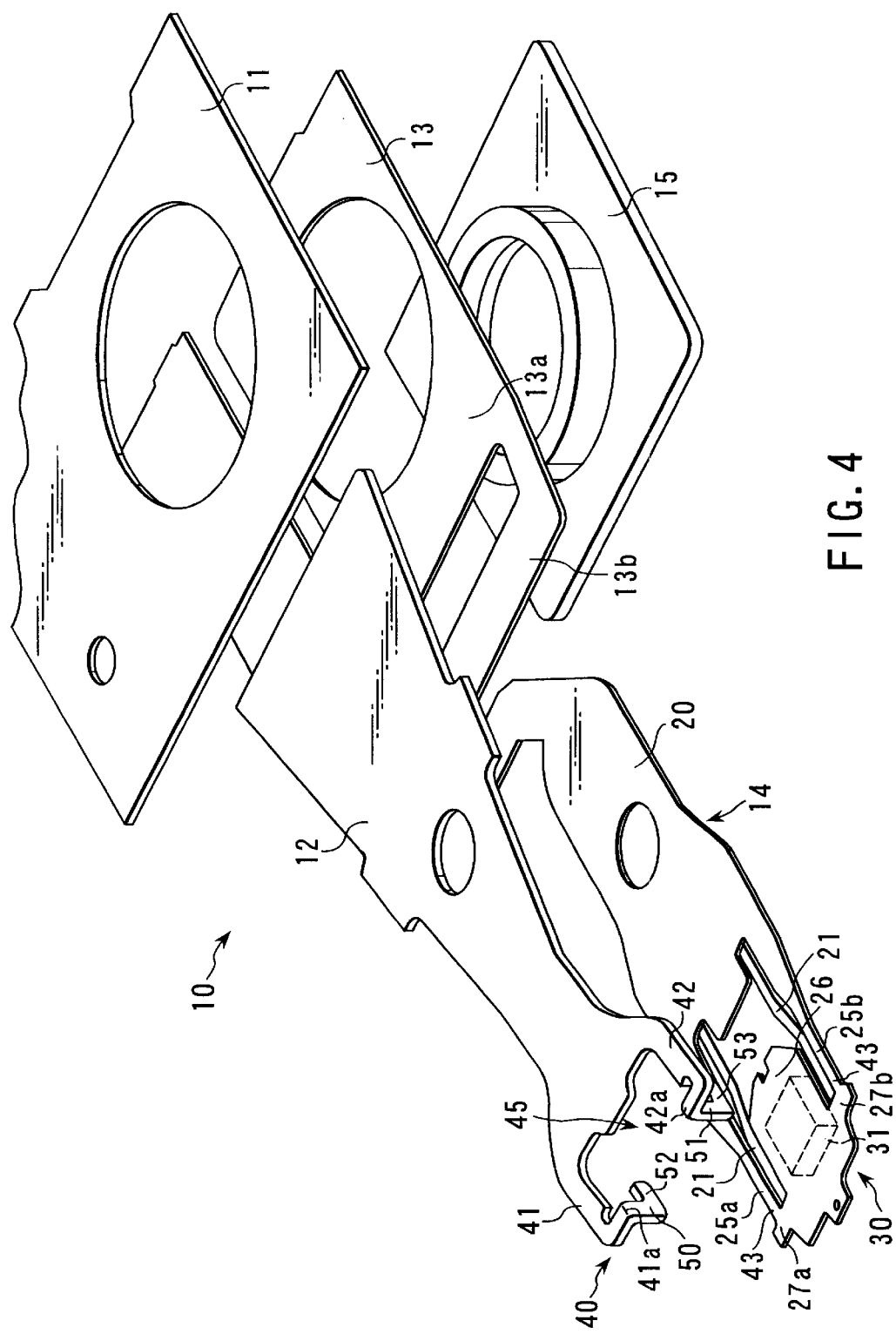
FIG. 4 is an exploded perspective view of the suspension shown in FIG. 1.

A suspension 10 for disc drive shown in FIG. 3 comprises a base portion 11, a beam portion 12, a hinge member 13 that connects the base portion 11 and the beam portion 12 to each other, a wired flexure 14 attached to the beam portion 12 so as to be superposed in the thickness direction of the beam portion, etc. As shown in FIG. 4, a base plate 15 is fixed to the base portion 11.

The hinge member 13 is formed of a plate spring member, e.g., a rolled stainless-steel plate, which is thinner than the base portion 11 and the beam portion 12, and can bend in the thickness direction of the beam portion 12. One portion 13a of the hinge member 13 is fixed to the base portion 11, and the other portion 13b to the rear end portion of the beam portion 12. The beam portion 12 has a thickness of about 100 $\mu$m, for example.

The hinge member 13 is composed of a component that is formed independently of the base plate 15 and the beam portion 12. Therefore, a spring member of a material and a thickness that meet required properties of the hinge member 13 can be adopted without regard to the base plate 15 and the beam portion 12. Thus, properties (e.g., high stiffness) that are required of the base portion 11 and the beam portion 12 can be easily reconciled with properties (e.g., low spring constant) that are required of the hinge member 13.

The wired flexure 14 includes a metal substrate 20 with a thickness of about 20 $\mu$m, a wiring portion 21 of a given pattern formed along the substrate 20 with an electrical insulating layer between them, etc. The substrate 20 of the flexure 14 is formed of a plate spring member (e.g., rolled stainless steel) that is further thinner than the beam portion 12 and the hinge member 13, and is fixed in a given position on the beam portion 12 by laser welding or the like.

The flexure 14 of this embodiment integrally includes a pair of outrigger portions 25a and 25b, left and right, and a tongue 26 that serves as a slider mounting portion. The front end portion of the tongue 26 is connected to the respective front end portions of the outrigger portions 25a and 25b by means of connecting portions 27a and 27b, respectively. A slider 31 that constitutes a head portion 30 is mounted on the tongue 26.

Figure 1:
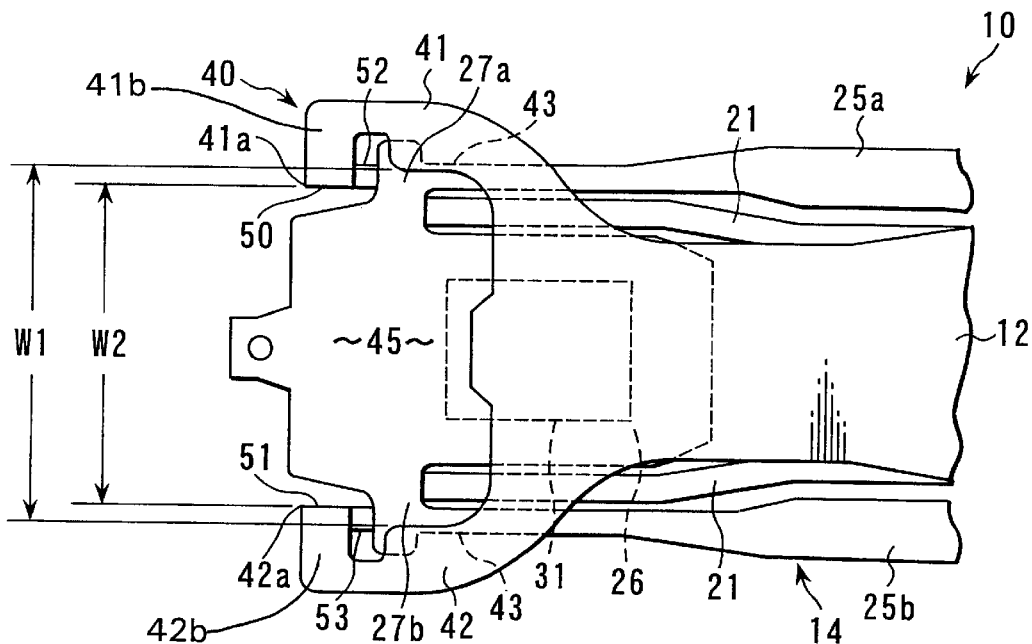
FIG. 1 is a plan view of a part of a suspension for disc drive according to a first embodiment of the present invention.
Figure 2:
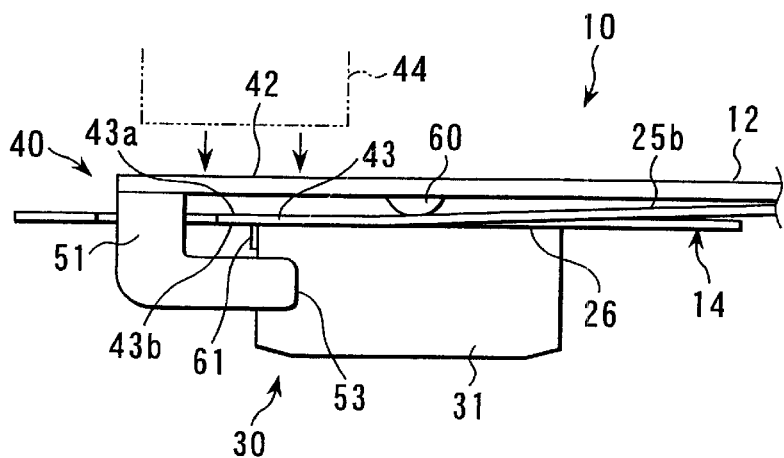
FIG. 2 is a side view of a part of the suspension shown in FIG. 1.

A limiter 40 for restraining an excessive swing of the flexure 14 is provided on the distal end portion of the beam portion 12. The limiter 40 includes a pair of arm portions 41 and 42 that are integral with the beam portion 12. The arm portions 41 and 42 project outside to-be-supported portions 43 of the flexure in opposite directions from the opposite sides, left and right, of the distal end portion of the beam portion 12, individually, and extend ahead of the to-be-supported portions 43. The respective reverse sides of the arm portions 41 and 42 face one-side surfaces 43a of their corresponding supported portions 43. Formed between the arm portions 41 and 42 is an aperture 45 that is wide enough to receive a bonding jig 44 (part of which is shown in FIG. 2). In addition, inward extending portions 41b, 42b extend from ends of the arm portions 41, 42 in directions facing each other.

Further, the limiter 40 is provided with a pair of bent portions 50 and 51 on the respective distal ends of their corresponding arm portions 41 and 42. The bent portions 50 and 51 are directed from the respective one-side surfaces 43a of their corresponding to-be-supported portions 43 toward the other-side surfaces 43b in a manner such that inside portions 41a and 42a at the respective distal ends of the arm portions 41 and 42 are bent substantially at right angles in the thickness direction of the beam portion 12.

Furthermore, the limiter 40 is provided with opposite portions 52 and 53 that extend rearward from the respective distal ends of their corresponding bent portions 50 and 51. The opposite portions 52 and 53 face the respective other-side surfaces 43b of their corresponding to-be-supported portions 43. In other words, the to-be-supported portions 43 of the flexure 14 are located at a distance from each other in the thickness direction between the arm portions 41 and 42 and the opposite portions 52 and 53, whereby the flexure 14 can be restrained from excessive swinging.

As shown in FIG. 2, the slider 31 is mounted on the tongue 26 that serves as the slider mounting portion. The beam portion 12 is provided with a convex dimple 60 that is in contact with the reverse side of the tongue 26. A terminal 61 of the slider 31 is connected electrically to a terminal of the wiring portion 21 by means of a conductor wire (not shown).

Thus, after the slider 31 is fixed to the tongue 26, the terminal 61 of the slider 31 and the wiring portion 21 are connected by gold wire bonding. As this is done, the jig 44 is inserted into the aperture 45 between the arm portions 41 and 42 so that the tongue 26 is supported by means of the jig 44. In this state, ultrasonic waves are applied to the terminals to be bonded by a bonding apparatus.

In the case of the limiter 40 of the suspension 10 of this embodiment, the arm portions 41 and 42 that extend forward from the opposite sides of the distal end of the beam portion 12 project outside the outrigger portions 25a and 25b, and the bent portions 50 and 51 are bend in the thickness direction at the inside portions 41a and 42a of the arm portions 41 and 42.

Figure 5:
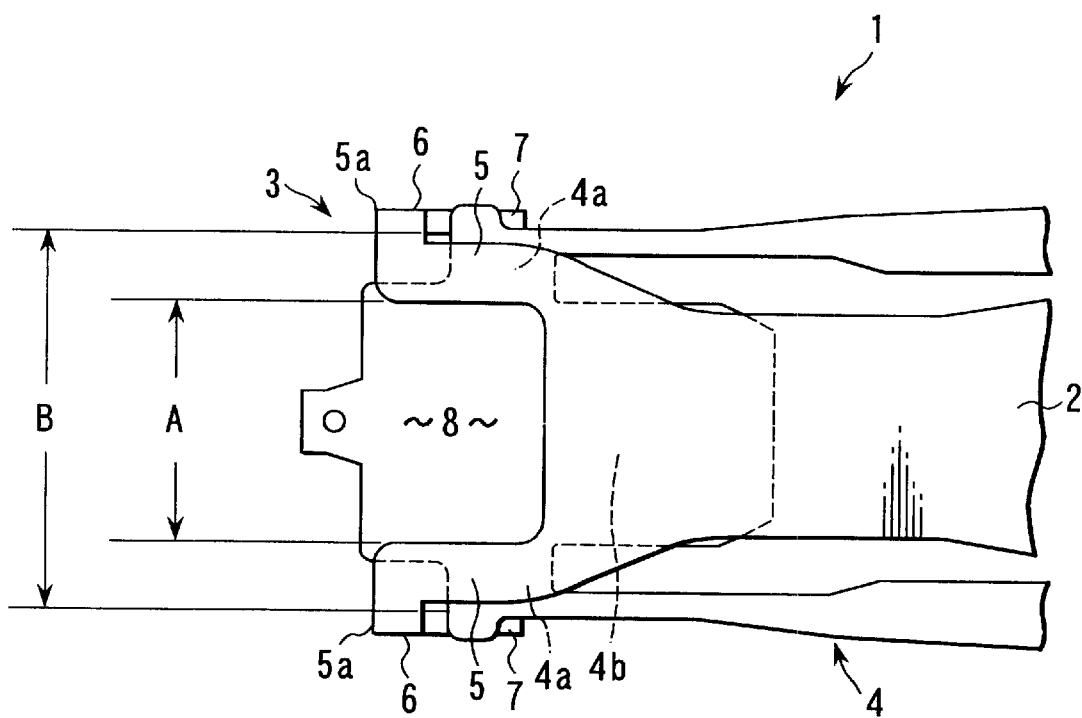
FIG. 5 is a plan view showing a part of a conventional suspension.

Accordingly, a width W1 of the aperture 45 between the arm portions 41 and 42 can be made greater than a substantial width W2 of the limiter 40. If the width W2 of the limiter 40 is equal to the width B of the limiter of the conventional suspension 1 shown in FIG. 5, therefore, the aperture 45 can be assured of a satisfactory width, so that the jig 44 used can be greater in size. Thus, reliable bonding can be secured.

In the limiter 40 of this embodiment, moreover, the arm portions 41 and 42 cross the outrigger portions 25a and 25b near the tongue 26. If the swing of the flexure 14 exceeds its tolerance limit, therefore, displacement of the outrigger portions 25a and 25b can be satisfactorily regulated by means of the arm portions 41 and 42. Thus, the swing of the flexure 14 can be restrained more effectively.

It is to be understood, in carrying out the present invention including the embodiments described herein, that the components of the invention, including the configuration of the beam portion, flexure, slider, wiring portion, limiter, etc., may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:

a beam portion;

a flexure attached to the beam portion so as to be superposed thereon and having a slider mounting portion fitted with a slider;

a wiring portion attached to the slider; and a limiter for restraining a swing of the flexure, wherein the limiter comprises:

a pair of arm portions projecting outside to-be-supported portions of the flexure in opposite directions from opposite sides of the distal end portion of the beam portion, extending ahead of the to-be-supported portions, and facing respective one-side surfaces of the to-be-supported portions, individually, an aperture that is formed between the arm portions and that is wide enough to receive a jig used in connecting the wiring portion to the slider, inward extending portions extending from ends of the arm portions in directions facing each other, bent portions bent in a thickness direction of the beam portion at ends of the inward extending portions so as to extend from the one-side surfaces of the to-be-supported portions toward the other-side surfaces at the respective distal ends of the arm portions, individually, and opposite portions extending rearward from the respective distal ends of the bent portions and facing the respective other-side surfaces of the to-be-supported portions, individually, said opposite portions being located such that the to-be-supported portions are interposed between the opposite portions and the arm portions in the thickness direction of the beam portion.

2. A suspension for disc drive according to claim 1, further comprising a base portion, and a hinge member that is located between the base portion and the beam portion and that is springy enough to bend in the thickness direction of the beam portion.

* * * * *